US008386167B2

(12) United States Patent
Clark et al.

(10) Patent No.: US 8,386,167 B2
(45) Date of Patent: Feb. 26, 2013

(54) DISPLAY OF TAXI ROUTE CONTROL POINT INFORMATION

(75) Inventors: Samuel T. Clark, Federal Way, WA (US); Keith L. Johnson, Seattle, WA (US); Andrew D. Neff, Kent, WA (US); Roglenda R. Bowe, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 475 days.

(21) Appl. No.: 12/271,279

(22) Filed: Nov. 14, 2008

(65) Prior Publication Data

US 2010/0125403 A1    May 20, 2010

(51) Int. Cl.
*G01C 21/00* (2006.01)
(52) U.S. Cl. ............................................. 701/411
(58) Field of Classification Search .................. None
See application file for complete search history.

(56) References Cited

U.S. PATENT DOCUMENTS

| | | | |
|---|---|---|---|
| 3,191,147 A | 6/1965 | Majendie | |
| 3,696,671 A | 10/1972 | Steigleder et al. | |
| 3,706,969 A | 12/1972 | Paredes | |
| 3,825,180 A | 7/1974 | Gallagher | |
| 3,848,833 A | 11/1974 | Rauschelbach | |
| 4,035,705 A | 7/1977 | Miller | |
| 4,043,526 A | 8/1977 | Donley et al. | |
| 4,147,056 A | 4/1979 | Muller | |
| 4,196,474 A | 4/1980 | Buchanan et al. | |
| 4,212,064 A | 7/1980 | Forsythe et al. | |
| 4,224,569 A | 9/1980 | Campbell | |
| 4,224,669 A | 9/1980 | Brame | |
| 4,247,843 A | 1/1981 | Miller | |
| 4,274,096 A | 6/1981 | Dennison | |
| 4,325,123 A | 4/1982 | Graham | |
| 4,424,038 A | 1/1984 | Tingleff et al. | |
| 4,471,439 A | 9/1984 | Robbins et al. | |
| 4,536,843 A | 8/1985 | Lambregts | |

(Continued)

FOREIGN PATENT DOCUMENTS

DE    3315386 A    10/1984
DE    3610925        3/1987

(Continued)

OTHER PUBLICATIONS

U.S. Appl. No. 11/939,806, filed Nov. 14, 2007 entitled "Multi-Function Switches for a Display", Inventors: Clark et al.

(Continued)

*Primary Examiner* — Thomas Tarcza
*Assistant Examiner* — Adam Alharbi
(74) *Attorney, Agent, or Firm* — Hope Baldauff Hartman, LLC

(57) ABSTRACT

Methods, systems, and computer-readable media described herein provide for the display of taxi route control point information in conjunction with an alphanumeric taxi route display in an aircraft. Taxi route data is received and compared with airport map information to determine any taxi route control points along the taxi route. Information associated with the taxi route control points is then collected and displayed on a display unit of the aircraft in conjunction with an alphanumeric display of the taxi route. The information associated with the taxi route control points may include ATC clearance information, runway and taxiway status information, runway orientation information, runway and taxiway traffic information, or taxi route information such as distance remaining to the taxi route control point.

20 Claims, 8 Drawing Sheets

U.S. PATENT DOCUMENTS

| | | |
|---|---|---|
| 4,604,711 A | 8/1986 | Benn et al. |
| H139 H | 10/1986 | Task |
| 4,631,678 A | 12/1986 | Angermuller et al. |
| 4,642,775 A | 2/1987 | Cline |
| 4,702,244 A | 10/1987 | Mazzocco |
| 4,723,613 A | 2/1988 | Garlen et al. |
| 4,729,102 A | 3/1988 | Miller, Jr. et al. |
| 4,746,981 A | 5/1988 | Nadan et al. |
| 4,792,906 A | 12/1988 | King et al. |
| 4,845,495 A | 7/1989 | Bollard et al. |
| 4,860,007 A | 8/1989 | Konicke et al. |
| 4,880,000 A | 11/1989 | Holmes et al. |
| 4,919,130 A | 4/1990 | Stoy et al. |
| 4,939,661 A | 7/1990 | Barker et al. |
| 5,050,081 A | 9/1991 | Abbott et al. |
| 5,053,967 A | 10/1991 | Clavelloux et al. |
| 5,070,458 A | 12/1991 | Gilmore et al. |
| 5,072,218 A | 12/1991 | Spero et al. |
| 5,086,513 A | 2/1992 | Lawrence et al. |
| 5,100,410 A | 3/1992 | Dulebohn |
| 5,139,501 A | 8/1992 | Klaas |
| 5,200,902 A | 4/1993 | Pilley |
| 5,222,691 A | 6/1993 | Gold et al. |
| 5,238,203 A | 8/1993 | Skonieczny et al. |
| 5,243,339 A | 9/1993 | Graham et al. |
| 5,283,643 A | 2/1994 | Fujimoto |
| 5,289,185 A | 2/1994 | Ramier et al. |
| 5,310,135 A | 5/1994 | Fowler et al. |
| 5,310,136 A | 5/1994 | Fowler et al. |
| 5,329,277 A | 7/1994 | Dougan et al. |
| 5,337,982 A | 8/1994 | Sherry |
| 5,343,395 A | 8/1994 | Watts |
| 5,416,705 A | 5/1995 | Barnett |
| 5,420,582 A | 5/1995 | Kubbat et al. |
| 5,454,074 A | 9/1995 | Hartel et al. |
| 5,475,594 A | 12/1995 | Oder et al. |
| 5,499,025 A | 3/1996 | Middleton et al. |
| 5,508,928 A | 4/1996 | Tran |
| 5,519,392 A | 5/1996 | Oder et al. |
| 5,519,618 A | 5/1996 | Kastner |
| 5,523,949 A | 6/1996 | Agate et al. |
| 5,587,724 A | 12/1996 | Matsuda |
| 5,592,198 A | 1/1997 | Fagard et al. |
| 5,593,114 A | 1/1997 | Ruhl |
| 5,629,691 A | 5/1997 | Jain |
| 5,668,542 A | 9/1997 | Wright |
| 5,712,785 A | 1/1998 | Mok et al. |
| 5,715,163 A | 2/1998 | Bang et al. |
| 5,736,955 A | 4/1998 | Roif |
| 5,736,985 A | 4/1998 | Lection et al. |
| 5,739,769 A | 4/1998 | Vladimir et al. |
| 5,745,054 A | 4/1998 | Wilkens et al. |
| 5,745,866 A | 4/1998 | Steiner |
| 5,746,392 A | 5/1998 | Gast |
| 5,790,209 A | 8/1998 | Engelhardt et al. |
| 5,798,712 A | 8/1998 | Coquin et al. |
| 5,802,492 A | 9/1998 | DeLorme et al. |
| 5,803,408 A | 9/1998 | Gast |
| 5,825,306 A | 10/1998 | Hiyokawa et al. |
| 5,844,503 A | 12/1998 | Riley et al. |
| 5,875,998 A | 3/1999 | Gleine et al. |
| 5,884,219 A | 3/1999 | Curtwright et al. |
| 5,901,927 A | 5/1999 | Ho |
| 5,916,297 A | 6/1999 | Griffin, II et al. |
| 5,920,321 A | 7/1999 | Owen et al. |
| 5,940,013 A | 8/1999 | Vladimir et al. |
| 5,941,930 A | 8/1999 | Morimoto et al. |
| 5,971,318 A | 10/1999 | Lustre |
| 5,978,715 A | 11/1999 | Briffe et al. |
| 5,983,158 A | 11/1999 | Suzuki et al. |
| 5,995,290 A | 11/1999 | Noble |
| 6,005,513 A | 12/1999 | Hardesty et al. |
| 6,038,498 A | 3/2000 | Briffe et al. |
| 6,057,786 A | 5/2000 | Briffe |
| 6,067,502 A | 5/2000 | Hayashida et al. |
| 6,072,473 A | 6/2000 | Muller et al. |
| 6,075,467 A | 6/2000 | Ninagawa et al. |
| 6,085,129 A | 7/2000 | Schardt |
| 6,098,014 A | 8/2000 | Kranz |
| 6,112,141 A | 8/2000 | Briffe et al. |
| 6,118,385 A | 9/2000 | LEard et al. |
| 6,121,899 A | 9/2000 | Theriault |
| 6,128,553 A | 10/2000 | Gordon et al. |
| 6,154,151 A | 11/2000 | McElreath et al. |
| 6,161,062 A | 12/2000 | Sicre et al. |
| 6,163,309 A | 12/2000 | Weinert |
| 6,165,142 A | 12/2000 | Bar |
| 6,175,315 B1 | 1/2001 | Millard et al. |
| 6,181,987 B1 | 1/2001 | Deker et al. |
| 6,188,937 B1 | 2/2001 | Sherry |
| 6,199,015 B1 | 3/2001 | Curtwright et al. |
| 6,246,320 B1 | 6/2001 | Monroe |
| 6,246,342 B1 | 6/2001 | Vandevoorde et al. |
| 6,262,720 B1 | 7/2001 | Jeffrey et al. |
| 6,275,172 B1 | 8/2001 | Curtis et al. |
| 6,278,913 B1 | 8/2001 | Jiang et al. |
| 6,289,277 B1 | 9/2001 | Feyerisen et al. |
| 6,313,759 B1 | 11/2001 | Musland-Sipper |
| 6,314,366 B1 | 11/2001 | Farmakis et al. |
| 6,314,370 B1 | 11/2001 | Curtright |
| 6,335,694 B1 | 1/2002 | Beksa et al. |
| 6,346,892 B1 | 2/2002 | DeMers et al. |
| 6,362,750 B1 | 3/2002 | Castor et al. |
| 6,381,519 B1 | 4/2002 | Snyder |
| 6,381,538 B1 | 4/2002 | Robinson et al. |
| 6,389,333 B1 | 5/2002 | Hansman |
| 6,389,355 B1 | 5/2002 | Gibbs et al. |
| 6,405,975 B1 | 6/2002 | Sankrithi et al. |
| 6,411,877 B2 | 6/2002 | Bockmann et al. |
| 6,424,909 B2 | 7/2002 | Kusano et al. |
| 6,442,394 B1 | 8/2002 | Valentine et al. |
| 6,443,399 B1 | 9/2002 | Yount et al. |
| 6,453,236 B1 | 9/2002 | Aoki |
| 6,462,697 B1 | 10/2002 | Klamer et al. |
| 6,466,235 B1 | 10/2002 | Smith et al. |
| 6,470,224 B1 | 10/2002 | Drake et al. |
| 6,473,675 B2 | 10/2002 | Sample |
| 6,507,739 B1 | 1/2003 | Gross et al. |
| 6,512,527 B1 | 1/2003 | Barber et al. |
| 6,522,958 B1 | 2/2003 | Dwyer et al. |
| 6,542,796 B1 | 4/2003 | Gibbs et al. |
| 6,545,601 B1 | 4/2003 | Monroe |
| 6,553,307 B2 | 4/2003 | Stratton et al. |
| 6,556,902 B2 | 4/2003 | Ing et al. |
| 6,561,463 B1 | 5/2003 | Yount et al. |
| 6,571,166 B1 | 5/2003 | Johnson et al. |
| 6,573,914 B1 | 6/2003 | Pauly et al. |
| 6,606,563 B2 | 8/2003 | Corcoran, III |
| 6,614,397 B2 | 9/2003 | Pullen et al. |
| 6,614,419 B1 | 9/2003 | May |
| 6,633,810 B1 | 10/2003 | Qureshi et al. |
| 6,636,786 B2 | 10/2003 | Partel |
| 6,668,215 B2 | 12/2003 | Lafon et al. |
| 6,690,295 B1 | 2/2004 | De Boer |
| 6,690,299 B1 | 2/2004 | Suiter |
| 6,693,559 B1 | 2/2004 | Gyde et al. |
| 6,694,249 B1 | 2/2004 | Anderson et al. |
| 6,696,980 B1 | 2/2004 | Langner et al. |
| 6,697,718 B2 | 2/2004 | Le Draoullec et al. |
| 6,707,387 B2 | 3/2004 | Noguchi et al. |
| 6,710,723 B2 | 3/2004 | Muller et al. |
| 6,711,475 B2 | 3/2004 | Murphy et al. |
| 6,720,891 B2 | 4/2004 | Chen et al. |
| 6,721,640 B2 | 4/2004 | Glenn et al. |
| 6,731,226 B2 | 5/2004 | Walter |
| 6,735,505 B2 | 5/2004 | Levine |
| 6,745,113 B2 | 6/2004 | Griffin, III et al. |
| 6,751,545 B2 | 6/2004 | Walter |
| 6,753,891 B1 | 6/2004 | Chohan et al. |
| 6,759,946 B2 | 7/2004 | Sahinoglu et al. |
| 6,784,869 B1 | 8/2004 | Clark et al. |
| 6,789,010 B2 | 9/2004 | Walter |
| 6,812,858 B2 | 11/2004 | Griffin, III |
| 6,816,780 B2 | 11/2004 | Naimer et al. |
| 6,842,672 B1 | 1/2005 | Straub et al. |
| 6,856,864 B1 | 2/2005 | Gibbs et al. |
| 6,862,519 B2 | 3/2005 | Walter |

| | | |
|---|---|---|
| 6,870,490 B2 | 3/2005 | Sherry et al. |
| 6,871,124 B1 | 3/2005 | McElreath |
| 6,897,790 B2 | 5/2005 | Orton |
| 6,898,492 B2 | 5/2005 | De Leon |
| 6,909,967 B2 | 6/2005 | Hirano et al. |
| 6,915,190 B2 | 7/2005 | Galasso |
| 6,922,631 B1 | 7/2005 | Dwyer et al. |
| 6,927,782 B2 | 8/2005 | Coldefy et al. |
| 6,934,608 B2 | 8/2005 | Qureshi |
| 6,946,976 B1 | 9/2005 | Langner et al. |
| 6,957,130 B1 | 10/2005 | Horvath et al. |
| 6,980,198 B1 | 12/2005 | Gyde et al. |
| 6,992,596 B2 | 1/2006 | Cole et al. |
| 6,992,597 B2 | 1/2006 | Rogers et al. |
| 7,024,287 B2 | 4/2006 | Peckham et al. |
| 7,030,892 B1 | 4/2006 | Gyde et al. |
| 7,039,505 B1 | 5/2006 | Southard et al. |
| 7,039,509 B2 | 5/2006 | Podowski |
| 7,049,953 B2 | 5/2006 | Monroe |
| 7,057,549 B2 | 6/2006 | Block |
| 7,072,746 B1 | 7/2006 | Burch |
| 7,093,070 B2 | 8/2006 | Rowlan |
| 7,103,455 B2 | 9/2006 | Subelet |
| 7,142,131 B2 | 11/2006 | Sikora |
| 7,148,814 B2 | 12/2006 | Sikora et al. |
| 7,148,815 B2 | 12/2006 | Derringer |
| 7,177,731 B2 | 2/2007 | Sandell et al. |
| 7,181,478 B1 | 2/2007 | Korson et al. |
| 7,194,342 B1 | 3/2007 | Horvath et al. |
| 7,203,577 B2 | 4/2007 | Griffin, III et al. |
| 7,222,017 B2 | 5/2007 | Clark et al. |
| 7,230,632 B2 | 6/2007 | Coldefy et al. |
| 7,256,710 B2 | 8/2007 | Griffin, III et al. |
| 7,317,449 B2 | 1/2008 | Robbins et al. |
| 7,321,318 B2 | 1/2008 | Crane et al. |
| 7,343,229 B1 | 3/2008 | Wilson |
| 7,345,693 B2 | 3/2008 | Coldefy et al. |
| 7,382,288 B1 | 6/2008 | Wilson et al. |
| 7,437,221 B2 | 10/2008 | Hardman et al. |
| 7,441,183 B2 | 10/2008 | Burstrom et al. |
| 7,555,372 B2 | 6/2009 | Dwyer |
| 7,567,187 B2 | 7/2009 | Ramaiah et al. |
| 7,580,235 B2 | 8/2009 | Hamasaki et al. |
| 7,587,278 B2 | 9/2009 | Poe et al. |
| 7,621,653 B2 | 11/2009 | Hendrie |
| 7,676,303 B2 | 3/2010 | Hanel |
| 7,711,457 B2 | 5/2010 | Caillaud |
| RE41,396 E | 6/2010 | Clark et al. |
| 7,751,948 B2 | 7/2010 | Boorman et al. |
| 7,835,825 B2 | 11/2010 | Coulmeau et al. |
| 7,844,372 B2 | 11/2010 | Chen et al. |
| 7,844,392 B2 | 11/2010 | Dubourg |
| 7,945,354 B2 | 5/2011 | Boorman et al. |
| 2002/0030609 A1 | 3/2002 | Baumgartner et al. |
| 2002/0033837 A1 | 3/2002 | Munro |
| 2002/0099528 A1 | 7/2002 | Hett |
| 2002/0111740 A1 | 8/2002 | Horvath et al. |
| 2002/0120392 A1 | 8/2002 | Stratton et al. |
| 2003/0009278 A1* | 1/2003 | Mallet et al. ............ 701/120 |
| 2003/0025719 A1 | 2/2003 | Palmer et al. |
| 2003/0045994 A1 | 3/2003 | Stratton et al. |
| 2003/0050805 A1 | 3/2003 | Gouyet et al. |
| 2003/0105579 A1 | 6/2003 | Walter |
| 2003/0132860 A1 | 7/2003 | Feyereisen et al. |
| 2003/0182052 A1 | 9/2003 | DeLorme et al. |
| 2003/0225492 A1 | 12/2003 | Cope et al. |
| 2004/0006412 A1 | 1/2004 | Doose et al. |
| 2004/0054550 A1* | 3/2004 | Cole et al. ............ 705/1 |
| 2004/0059474 A1 | 3/2004 | Boorman et al. |
| 2004/0059497 A1 | 3/2004 | Sankrithi |
| 2004/0186639 A1 | 9/2004 | Car |
| 2004/0230352 A1 | 11/2004 | Monroe |
| 2005/0085959 A1 | 4/2005 | Feyereisen |
| 2005/0090969 A1 | 4/2005 | Siok et al. |
| 2005/0178903 A1 | 8/2005 | Boorman et al. |
| 2005/0182528 A1 | 8/2005 | Dwyer et al. |
| 2005/0192717 A1 | 9/2005 | Tafs et al. |
| 2005/0192739 A1* | 9/2005 | Conner et al. ............ 701/120 |
| 2005/0203675 A1 | 9/2005 | Griffin et al. |
| 2005/0222721 A1 | 10/2005 | Chen et al. |
| 2005/0228674 A1 | 10/2005 | Gunn et al. |
| 2005/0231390 A1 | 10/2005 | Crane et al. |
| 2005/0283305 A1* | 12/2005 | Clark et al. ............ 701/120 |
| 2006/0004496 A1 | 1/2006 | Tucker et al. |
| 2006/0005147 A1 | 1/2006 | Hammack et al. |
| 2006/0066590 A1 | 3/2006 | Ozawa et al. |
| 2007/0179703 A1 | 8/2007 | Soussiel et al. |
| 2007/0241936 A1 | 10/2007 | Arthur et al. |
| 2007/0299597 A1 | 12/2007 | Fetzmann et al. |
| 2008/0039984 A1 | 2/2008 | Bitar et al. |
| 2008/0065275 A1 | 3/2008 | Vizzini |
| 2008/0106438 A1 | 5/2008 | Clark et al. |
| 2008/0143557 A1 | 6/2008 | Smith |
| 2008/0189646 A1 | 8/2008 | Bohle |
| 2008/0251308 A1 | 10/2008 | Molnar et al. |
| 2008/0270020 A1* | 10/2008 | Raab ............ 701/201 |
| 2008/0312776 A1 | 12/2008 | Sylvester |
| 2009/0051570 A1* | 2/2009 | Clark et al. ............ 340/971 |
| 2009/0062972 A1 | 3/2009 | Boorman et al. |
| 2009/0306887 A1* | 12/2009 | Clark et al. ............ 701/202 |
| 2010/0076627 A1 | 3/2010 | Boorman et al. |
| 2010/0076628 A1 | 3/2010 | Boorman et al. |
| 2010/0109936 A1* | 5/2010 | Levy ............ 342/30 |
| 2010/0262319 A1 | 10/2010 | Gunn et al. |
| 2010/0262358 A1 | 10/2010 | Boorman et al. |
| 2011/0060484 A1 | 3/2011 | Chen et al. |
| 2011/0224848 A1 | 9/2011 | Boorman et al. |

FOREIGN PATENT DOCUMENTS

| | | |
|---|---|---|
| DE | 4140406 | 6/1993 |
| EP | 0286120 | 10/1988 |
| EP | 0370640 | 5/1990 |
| EP | 0489521 | 6/1992 |
| EP | 0519282 | 12/1992 |
| EP | 1273987 | 1/2003 |
| FR | 2817831 | 6/2002 |
| FR | 2848306 | 6/2004 |
| GB | 886136 | 1/1962 |
| GB | 2144248 A | 2/1985 |
| JP | 05338594 | 12/1993 |
| JP | 07113652 A | 5/1995 |
| JP | 2002013935 A | 1/2002 |
| WO | WO 96/03924 | 2/1996 |
| WO | WO 96/20662 | 7/1996 |
| WO | WO 96/25101 | 8/1996 |
| WO | WO 99/21514 | 5/1999 |
| WO | WO 02/24530 | 3/2002 |
| WO | WO 02/26167 | 4/2002 |
| WO | WO 03/071228 A2 | 8/2003 |
| WO | WO 2004027732 | 4/2004 |
| WO | WO 2006/085740 A1 | 8/2006 |

OTHER PUBLICATIONS

U.S. Appl. No. 11/954,387, filed Dec. 12, 2007 entitled "System and Method for Entry of Taxi Route on Control Display Unit", Inventors: Clark et al.

U.S. Appl. No. 12/015,391, filed Jan. 16, 2008 entitled "System and Method for Multiple Delete Entry on Control Display Unit", Inventors: Clark et al.

U.S. Appl. No. 12/133,114, filed Jun. 4, 2008 entitled "System and Method for Taxi Route Entry Parsing", Inventors: Clark et al.

Deltasoft, F-15 Cockpit, Aug. 2001, http://web.archive.org/web/20010803031953/http://deltasoft.fife.wa.us/cockpit.htm Accessed Aug. 14, 2007.

NASA, F-18 Cockpit, 1995, www.dfrc.nasa.gov/gallery/Photo/F-18Chase/Medium/E95-43155-7.jpg Accessed Aug. 14, 2007.

Jones, et al., "Flight Demonstration of Integrated Airport Surface Automation Concepts," Proceedings of the 14th Digital Avionics Systems Conference, Cambridge, MA, Nov. 5-9, 1995, pp. 77-82.

McCann, R.S., et al., "Enhancing Taxi Performance Under Low Visibility: Are Moving Maps Enough?," Paper Presenting at the Human Factors and Ergonomics Society 41st Annual Meeting, 1997, Santa Monica, CA.

Theunissen, E. et al., "Design and Evaluation of Taxi Navigation Displays," Paper presented at the Proceedings of the 21 Digital Avionics Systems Conference, 2002, Irvine, CA.

Theunissen, e. et al., "Development and Implementation of an Exocentric ASMGCS Display," Digital Avionics Systems Conference, 2000, vol. 2, pp. 7.D 5.1-5.8, Oct. 7, 2000.
U.S. Official Action dated Nov. 14, 2007 in U.S. Appl. No. 11/939,806.
U.S. Official Action dated Jun. 23, 2011 in U.S. Appl. No. 11/939,806.
U.S. Official Action dated Sep. 23, 2011 in U.S. Appl. No. 11/939,806.
U.S. Official Action dated Dec. 22, 2009 in U.S. Appl. No. 11/954,387.
U.S. Official Action dated Apr. 26, 2012 in U.S. Appl. No. 11/954,387.
U.S. Official Action dated Apr. 18, 2011 in U.S. Appl. No. 12/015,391.
U.S. Official Action dated Sep. 16, 2011 in U.S. Appl. No. 12/015,391.
U.S. Official Action dated Aug. 19, 2011 in U.S. Appl. No. 12/133,114.
U.S. Notice of Allowance dated Jan. 19, 2012 in U.S. Appl. No. 12/133,114.
U.S. Office Action dated Apr. 11, 2012 in U.S. Appl. No. 11/939,806.
U.S. Office Action dated Jul. 5, 2012 in U.S. Appl. No. 11/939,806.
U.S. Office Action dated Oct. 4, 2012 in U.S. Appl. No. 11/954,387.
U.S. Office Action dated Dec. 6, 2012 in U.S. Appl. No. 11/939,806.

* cited by examiner

DISPLAY OF TAXI ROUTE CONTROL POINT INFORMATION

BACKGROUND

While taxiing an aircraft along the taxiways of a large, busy airport, flight crew awareness of information about runways that cross the aircraft's taxi route may mitigate, reduce, or prevent runway incursions and accidents. This information includes the location in the taxi route, identity, and orientation of the crossing runways; runway status, e.g. in-use, occupied or not occupied by other traffic, active, closed, etc.; and whether or not the aircraft is cleared to cross the runway by air traffic control ("ATC"). Additionally, such information regarding other taxi route control points during taxi, takeoff, and landing is also of operational value. These taxi route control points may include takeoff (departure) and landing (arrival) runways, runway taxi segments, crossing taxiways, crossing roadways, land and hold short operations ("LAHSO") runway points, taxiway hold points, and ramp hold points.

Aircraft crews currently have access to airport maps, either paper-based maps or electronic airport moving maps stored in an aircraft system. These maps depict the various labeled runways and taxiways and other features of the airport. However, these maps do not provide dynamic, real-time information about runways in or that cross the aircraft taxi route. Rather, the crew receives runway information by reviewing notices to airmen ("NOTAM"), by monitoring automated broadcasts such as automatic terminal information service ("ATIS") broadcasts, or by monitoring ATC and other aircraft radio communications. Moreover, the traditional method of communicating ATC taxiway and runway clearances to aircraft crew is by ATC radio or light gun communication. There is currently no cockpit display of the ATC clearance information. The lack of rapid visual access to crossing, taxi, departure, and arrival runway information in the aircraft cockpit increases crew workload and reduces crew situational awareness.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media described herein provide for the display of taxi route control point information in conjunction with an alphanumeric taxi route display in an aircraft. According to aspects presented herein, taxi route data is entered, received, or otherwise derived and compared with airport map information to determine any runways that cross the taxi route as well as other taxi route control points along the taxi route. Information associated with the crossing runways and other taxi route control points is then collected and displayed on a display unit of the aircraft in conjunction with an alphanumeric display of the taxi route. The information associated with the crossing runways and other taxi route control points may include ATC clearance information, runway and taxiway status information, runway orientation information, runway and taxiway traffic information, or taxi route information such as distance remaining to the taxi route control point.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
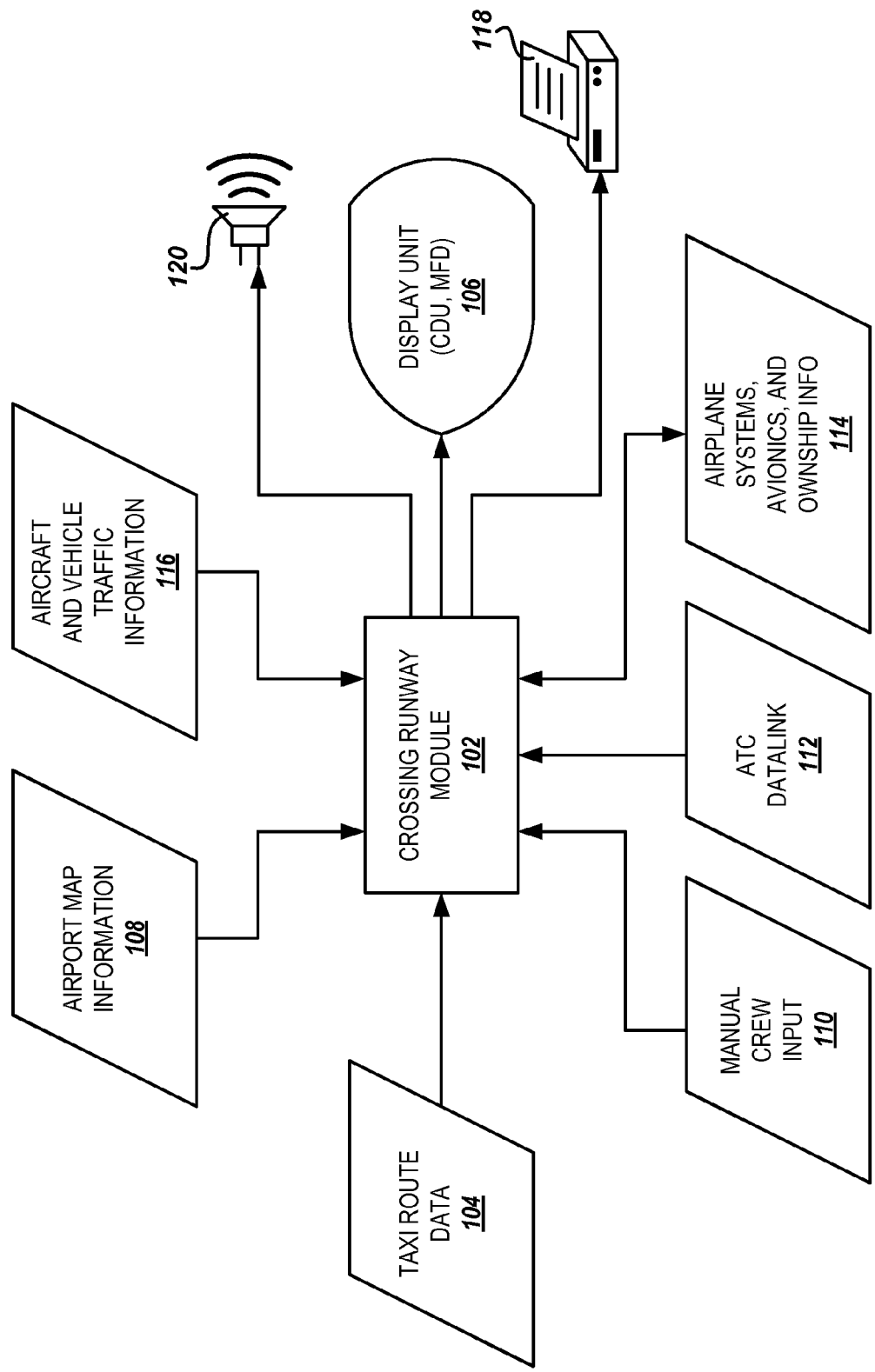
FIG. 1 is a block diagram illustrating the collection and display of taxi route control point information, according to embodiments presented herein.

The following detailed description is directed to methods, systems, and computer-readable media for displaying taxi route control point information in conjunction with an alphanumeric taxi route display in an aircraft. Utilizing the concepts and technologies described herein, aircraft crews may have readily available visual access to crossing runway and other taxi route control point information while taxiing the aircraft, including ATC clearance information, runway and taxiway status information, runway orientation information, runway and taxiway traffic information, or taxi route information such as distance remaining to the taxi route control point. The availability of this information in the aircraft cockpit improves crew situational awareness and decreases the potential for runway incursion and traffic collision hazards. These and other advantages and features will become apparent from the description of the various embodiments below.

Throughout this disclosure, embodiments are described with respect to an aircraft and the operation of an aircraft at an airport. An aircraft provides a useful example for embodiments described herein, since it likely represents the majority of vehicles operating on the taxiways of an airport. However, it should be understood that the concepts presented herein are equally applicable to ground vehicles operating on the taxiways, runways, and roadways of an airport, including, but not limited to, aircraft tow tractors, emergency response vehicles, aircraft service vehicles, and airport maintenance vehicles.

Further, while portions of this disclosure describe information regarding runways that cross a taxi route, it will be appreciated by one skilled in the art that the processing and displaying of crossing runway information shown in the figures and described herein may be applied to any taxi route control point that may occur along the taxi route or during taxi, takeoff, and landing. Such taxi route control points may include, but are not limited to, crossing runways, takeoff (departure) and landing (arrival) runways, runway taxi segments, land and hold short operations ("LAHSO") runway points, crossing taxiways, taxiway hold points, ramp hold points, and roadway hold points.

In the following detailed description, references are made to the accompanying drawings that form a part hereof and that show by way of illustration specific embodiments or examples. In referring to the drawings, like numerals represent like elements throughout the several figures.

FIG. 1 shows an exemplary flow of taxi route control point information from collection to display, according to embodiments. Various taxi route control point information regarding crossing runways, takeoff (departure) and landing (arrival) runways, runway taxi segments, crossing taxiways, taxiway hold points, and roadway hold points is collected by a crossing runway module 102, which may be a component of a comprehensive flight management system ("FMS") of an aircraft. As will be described below, the crossing runway module 102 may be implemented as software or hardware capable of collecting and interpreting data as described herein for display within an aircraft or other vehicle. Information collected by the crossing runway module 102 may include, but is not limited to, taxi route data 104, airport map information 108, manual crew input 110, information received over an ATC datalink 112, airplane systems, avionics, and ownership information 114, and aircraft and vehicle traffic information 116.

The crossing runway module 102 receives taxi route data 104 describing a taxi route for the aircraft. The taxi route data 104 may consist of a list of the taxiways along which the aircraft should proceed to move from point A, such as an airport gate, to point B, such as a departure runway. The taxi route data 104 may be entered manually by the crew utilizing a data entry terminal in the cockpit of the aircraft, such as a CDU. Alternatively, the taxi route data 104 may be retrieved from previously stored taxi routes contained in a database unit of the FMS, or it may be received from air traffic control over a wireless ATC datalink 112 established between the aircraft and ATC. In one embodiment, the taxi route data 104 represents the currently active taxi route of the aircraft.

The crossing runway module 102 utilizes a display unit 106 to display the taxi route control point information in conjunction with an alphanumeric taxi route display of the taxi route data 104, as will be described in more detail below. According to embodiments, the display unit 106 is located in the cockpit of the aircraft and may be an alphanumeric display, such as a CDU, or a graphical display, such as a multi-function display ("MFD") found in a modern "glass cockpit." Alternatively, the display may be a laptop computer display, an electronic flight bag display, a handheld display, or some other suitable display. In one embodiment, the taxi route control point information is included with a printout of the taxi route produced by a printer 118 located in the cockpit of the aircraft or in a remote location.

In another embodiment, the taxi route control point information may be accompanied by an aural attention getter, or redundant or complimentary aural information. The crossing runway module 102 may provide the accompanying aural information through a speaker 120 also located in the cockpit of the aircraft. The crossing runway module 102 may also provide the taxi route control point information to other airplane systems and avionics 114 of the aircraft.

In order to determine the runways that cross the current taxi route as well as other taxi route control points along the taxi route, the crossing runway module 102 utilizes the taxi route data 104 and airport map information 108 that contains an electronic database of the airport taxiways and runways. The airport map information 108 may be stored in the database unit of the FMS, which may further contain map information for a number of airports where the aircraft operates. The crossing runway module 102 uses the airport map information 108 and taxi route data 104 to determine the identity, location, and orientation of runways, taxiways, and roadways that cross the current taxi route as well as other taxi route hold points, as will be described in more detail below in regard to FIG. 5.

According to embodiments described herein, the taxi route control point information displayed by the crossing runway module 102 may include ATC clearance information, runway and taxiway status information, runway orientation information, runway and taxiway traffic information, or taxi route information such as distance remaining to the runway crossing or other taxi route control points. The crossing runway module 102 may receive this information from a number of sources. For example, the aircraft crew may provide the information to the crossing runway module 102 and the aircraft systems via manual crew input 110 provided at a CDU or other data terminal operatively connected to the aircraft system containing the crossing runway module 102. In addition, a wireless ATC datalink 112 may be established between the aircraft and air traffic control, allowing automatic flow of data regarding ATC clearance, runway and taxiway status, traffic, ATIS information, and NOTAM information to the aircraft. The crossing runway module 102 may also utilize airplane systems, avionics, and ownship information 114 as well as aircraft and vehicle traffic information 116 received from other aircraft and vehicles to display the taxi route control point information, as will be described in more detail below in regard to FIG. 5.

Figure 2A:
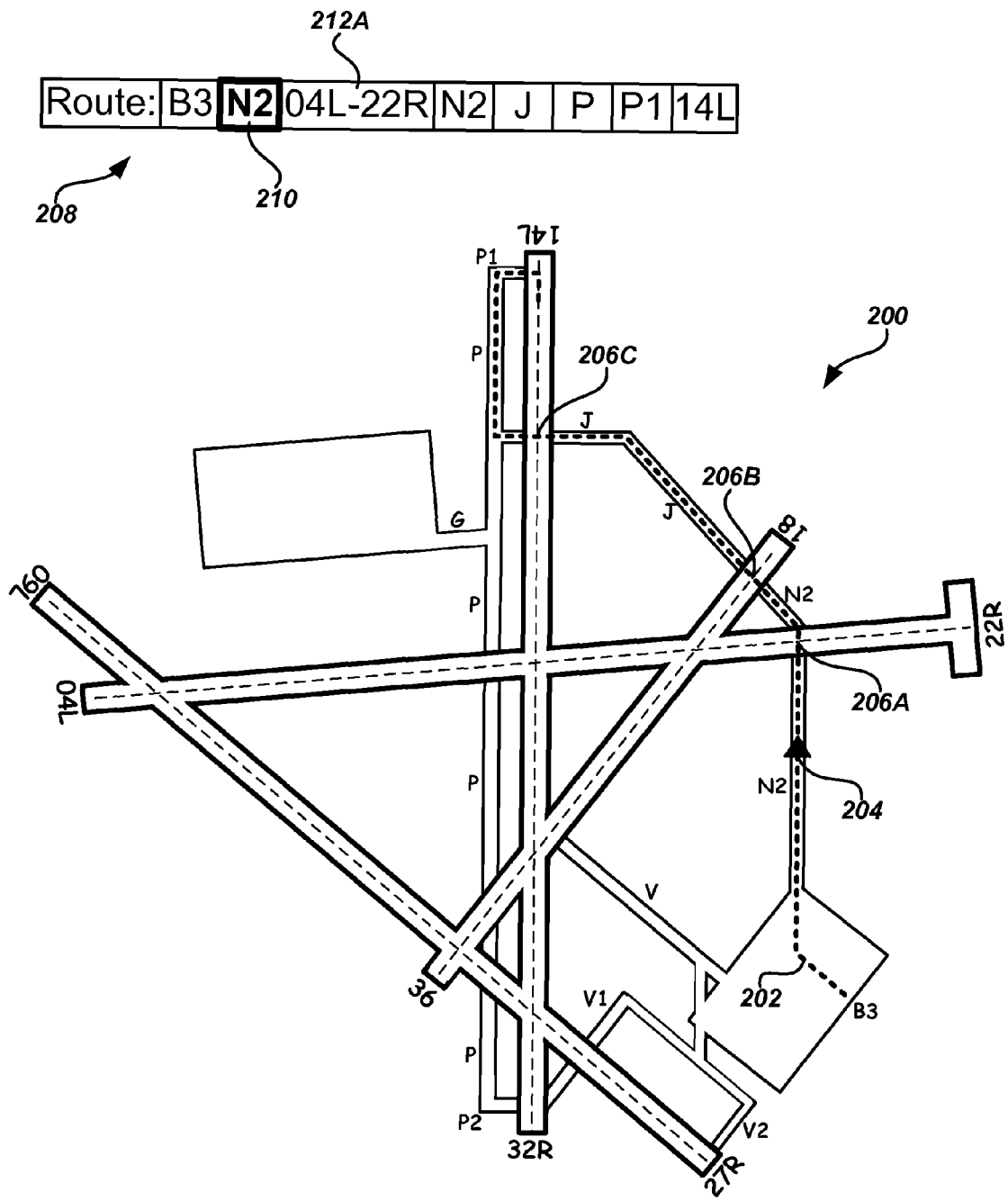
FIGS. 2A-2E illustrate exemplary alphanumeric taxi route displays including crossing runway information, shown in conjunction with a graphical map display of airport runways and taxiways, according to embodiments presented herein.

FIG. 2A shows a graphical airport map 200 displayed on the display unit 106 of the aircraft, such as an airport moving map displayed on an MFD in the cockpit of the aircraft. According to embodiments, a current taxi route 202 of the aircraft may be displayed on the graphical airport map 200. For example, the taxi route 202 displayed on the graphical airport map 200 in FIG. 2A takes the aircraft from gate B3, along taxiway N2 to taxiway J, then to taxiway P, then to taxiway P1, and finally to the departure runway 14L. The taxi route 202 crosses three runways on the graphical airport map 200. The taxi route 202 crosses runway 04L-22R at junction point 206A, runway 36-18 at junction point 206B, and runway 32R-14L at junction point 206C. In this example, the three runways 04L-22R, 36-18, and 32R-14L represent crossing runways for the taxi route 202. The current position and heading of the aircraft in relation to the active taxi route 202 may also be denoted on the graphical airport map 200 by a symbol, such as the symbol 204.

FIG. 2A also shows an alphanumeric taxi route display 208 showing the current taxi route 202 depicted on the graphical airport map 200. The alphanumeric taxi route display 208 may be displayed on the display unit 106 along with the graphical airport map 200, or it may appear on another graphical or alphanumeric display unit 106 of the aircraft. According to one embodiment, the alphanumeric taxi route display 208 is shown as a sequence of boxes, each box containing the alphanumeric label of an individual segment of the current taxi route 202. For example, the alphanumeric taxi route display 208 shown in FIG. 2 shows boxes corresponding to the taxi route segments B3, N2, J, P, P1, and 14L from the taxi route 202 described above. The box corresponding to the current segment 210, i.e. the current location of the aircraft along the taxi route 202, may be highlighted in the alphanumeric taxi route display 208, as further shown in FIG. 2A.

Figure 2B:
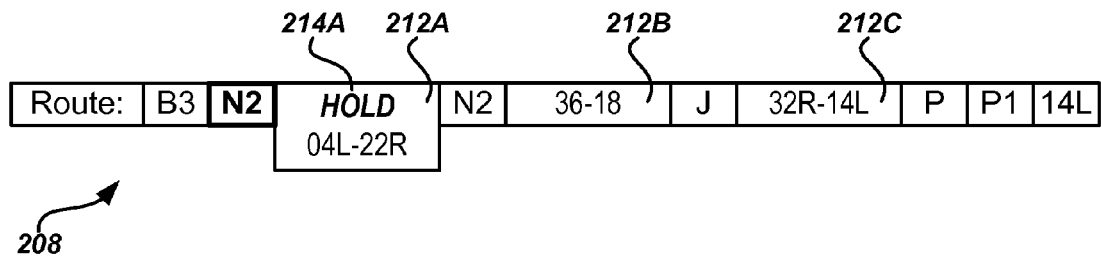

According to embodiments described herein, the alphanumeric taxi route display 208 further displays crossing runway information 212A for the runways that the aircraft will cross as it progresses along the taxi route 202. In one embodiment, crossing runway information 212A includes an identifier of the crossing runway, such as "04L-22R." The crossing runway information 212A may be displayed only for the next or pending runway crossing, as shown in FIG. 2A, or the crossing runway information may be displayed for all crossing runways along the taxi route 202, as shown in FIG. 2B. Alternatively, the crossing runway information may be displayed for a subset of crossing runways along the taxi route 202. The crossing runway information 212A-212C may be embedded in the alphanumeric taxi route display 208 as additional boxes in the taxi route sequence, as further shown in FIG. 2B, or it may be displayed above, below, or beside the alphanumeric taxi route display 208. In addition, the runway crossing information 212A-212C be displayed in some other portion of the display unit 106 on which the alphanumeric taxi route display 208 is displayed, or it may be displayed on a separate alphanumeric or graphical display unit 106 of the aircraft. Crossing runway information may be displayed in text, color, shape, or symbolic form, as will be described further below.

Figure 2C:
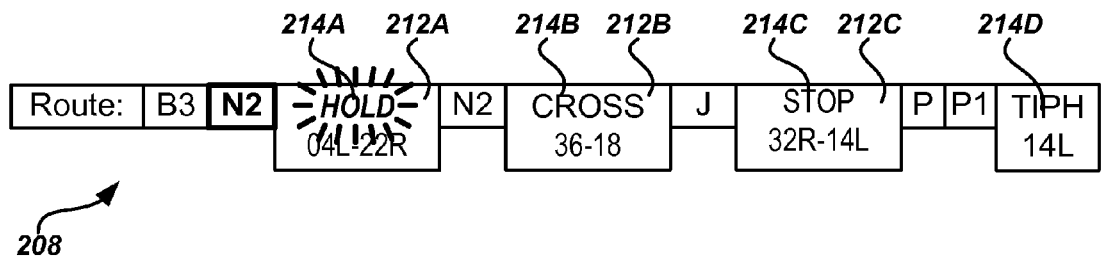

Along with the identifier of the crossing runway, the crossing runway information 212A further shows ATC clearance information 214A for the corresponding crossing runway, according to another embodiment. The ATC clearance information 214A may be included in the crossing runway information 212A only for pending runway crossings, as shown in FIG. 2B, or ATC clearance information may be included in the crossing runway information for all crossing runways displayed in the alphanumeric taxi route display 208, as shown in FIG. 2C. Alternatively, the ATC clearance information may be displayed for a subset of crossing runways in the alphanumeric taxi route display 208. ATC clearance information 214D may also be displayed for other runways along the taxi route, such as the "TIPH" (taxi into position and hold) displayed for the departure runway "14L" further illustrated in FIG. 2C.

The ATC clearance information 214A-214C may be explicitly stated for the crossing runway clearance condition, for example "HOLD," "CLEAR," "STOP," "CROSS," etc. Alternatively, only "HOLD," "STOP," or other critical ATC clearance information 214A, 214C may be displayed, making "CLEARed" to enter runway and cleared to "CROSS" conditions implicit in the absence of the ATC clearance information. According to one embodiment, the display of the ATC clearance information 214A-214C is altered by changing color, attributes, or otherwise enhancing the display to attract crew attention to a pending or critical condition. For example, as shown in FIG. 2C, the ATC clearance information 214A of "HOLD" may be made to flash as the aircraft approaches the clearance point for crossing runway 04L-22R. The enhancing of the ATC clearance information 214A for a pending or critical condition may be coupled with other visible indicators or aural tones or voices in the aircraft cockpit, as will be appreciated by one skilled in the art.

Figure 2D:
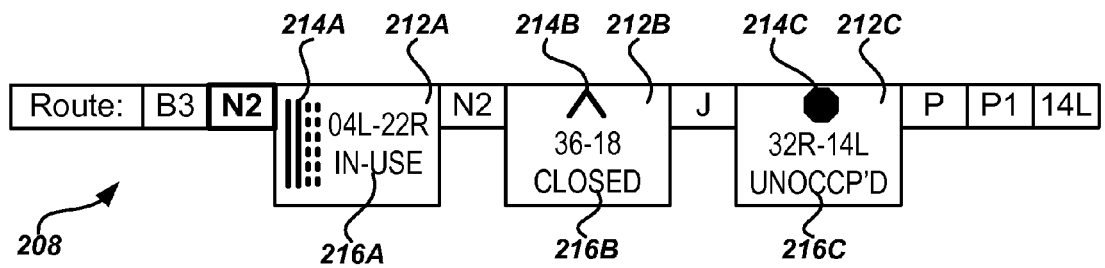

In a further embodiment, the ATC clearance information 214A-214C is displayed as symbols indicating the runway clearance condition of the corresponding crossing runways. For example, a depiction of hold short lines 214A may be displayed for a "HOLD" condition, a "|" or "•" symbol 214B displayed for a "CLEAR" or "CROSS" condition, and a stop sign symbol 214C displayed for a "STOP" condition, as shown in FIG. 2D. It will be appreciated that many other methods of color, shape, or aural coding of the display of ATC clearance information 214A-21C in the crossing runway information 212A-212C may be imagined by one skilled in the art, and it is intended that this application include all such methods of coding the display of ATC clearance information.

According to another embodiment, the crossing runway information 212A-212C also contains runway status information 216A-216C for the corresponding crossing runway, as further shown in FIG. 2D. As in the case of the ATC clearance information 214A-214C, the runway status information 216A-216C may be included in the crossing runway information 212A-212C only for pending runway crossings, for all crossing runways, or for a subset of crossing runways displayed in the alphanumeric taxi route display 208. The runway status information 216A-216C may explicitly state the real-time status of the corresponding runway, such as "IN-USE," "OCCUPIED," or "UNOCCUPIED," or only critical runway status information, such as "IN-USE" or "OCCUPIED," may be displayed, making non-critical statuses implicit in the absence of the runway status information. Alternatively, the runway status information 216A-216C may provide overall status of the corresponding runway, such as "USABLE," "UNUSABLE," "RESTRICTED," "CLOSED," etc.

Figure 2E:
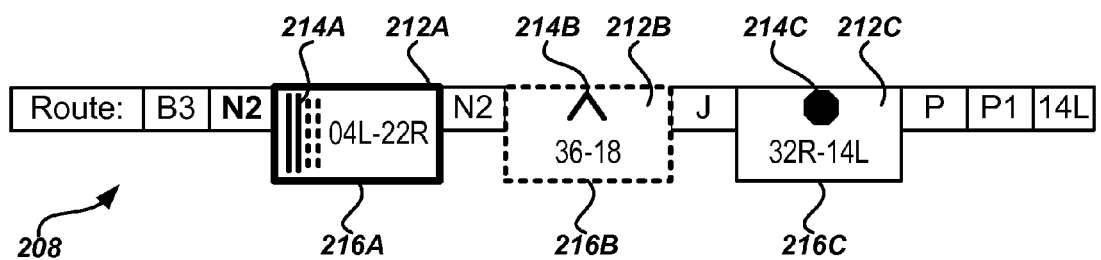

Alternatively, the runway status information 216A-216C may be symbolically indicated in the alphanumeric taxi route display 208, as shown in FIG. 2E. For example, a bold, solid blue border 216A may be displayed around the box in the alphanumeric taxi route display 208 containing the crossing runway information 212A for a runway "IN-USE." Similarly, a dashed, blue border 216B may be displayed for a runway that is "OCCUPIED," and a normal, thin border 216C may be displayed for runway that is "UNOCCUPIED." Alternatively, an "UNUSABLE," "RESTRICTED," or "CLOSED" runway may be symbolically indicated by an X drawn through the box containing the crossing runway information.

In one embodiment, the display of the runway status information 216A-216C may be altered to indicate a pending, critical condition. For example, the runway status information 216A of "IN-USE" may be made to flash as the aircraft approaches the crossing runway 04L-22R while progressing along the taxi route 202. It will be appreciated that many additional methods for displaying the runway status information 216A-216C in the crossing runway information 212A-212C may be imagined, including, but not limited to, coding the status information by shape, color, utilizing symbols for the various statuses, or accompanying critical status information with additional cockpit visual indicators or aural tones or voices. It is intended that this application include all such methods for displaying the runway status information 216A-216C.

Figure 3A:
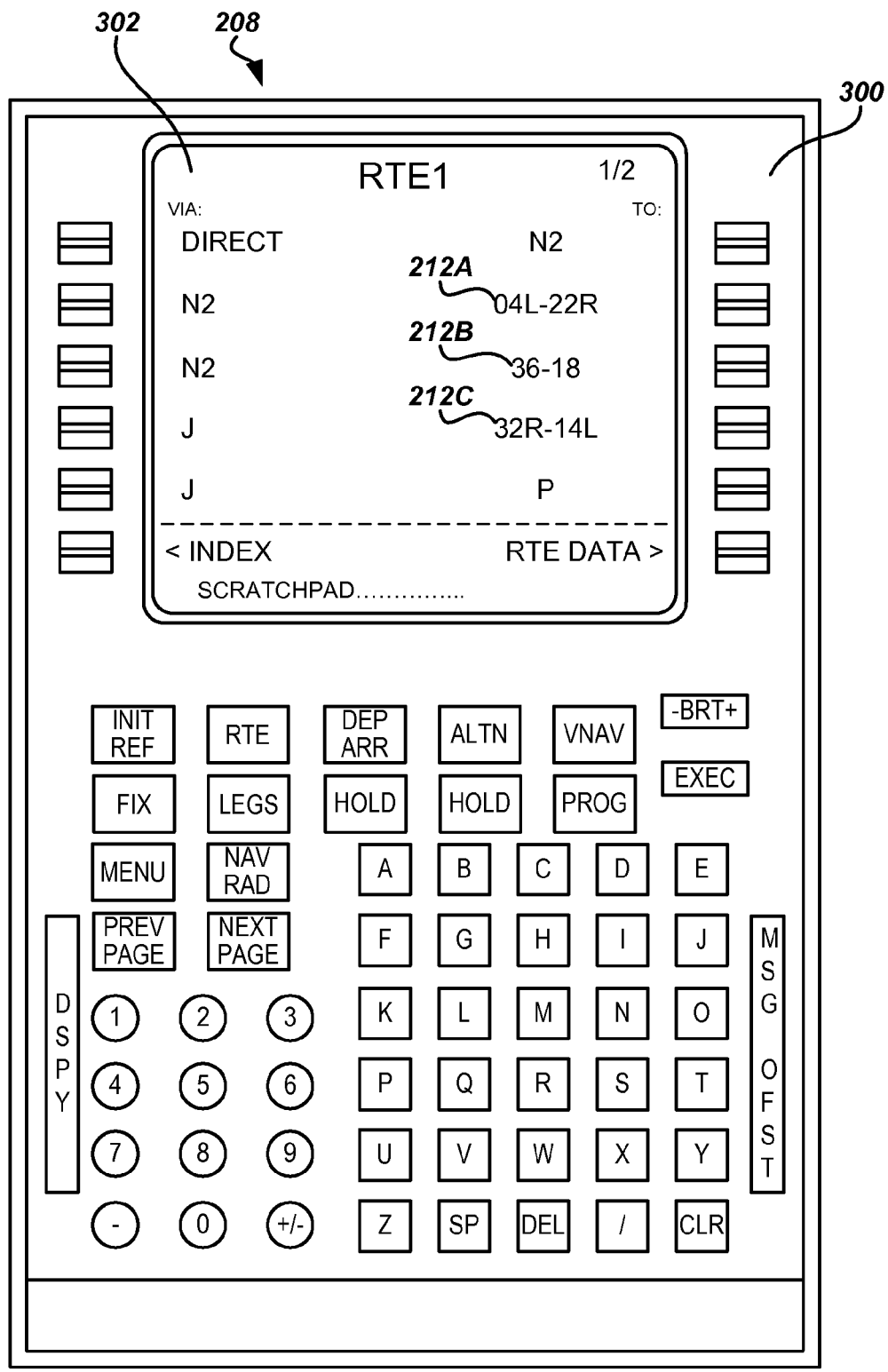
FIGS. 3A and 3B illustrate a conventional control display unit ("CDU") of a commercial aircraft displaying an alphanumeric taxi route including crossing runway information, according to one embodiment presented herein.

FIG. 3A shows a typical CDU 300 used in commercial aircraft. The CDU 300 may be used by the crew of the aircraft to interface with the FMS and other aircraft systems and functions. The CDU 300 includes a CDU screen 302 that may act as an alphanumeric display unit 106. According to further embodiments, the crossing runway information 212A-212C may be displayed in conjunction with an alphanumeric taxi route display 208 on the CDU screen 302 alone, in addition to, or as an alternative to the alphanumeric taxi route display shown with the graphical airport map 200. The CDU screen 302 shown in FIG. 3A displays a typical flight management function ROUTE page incorporating crossing runway information 212A-212C into an alphanumeric taxi route display 208, according to one embodiment. The crossing runway information 212A-212C consists of the identifiers for the runways crossing the current taxi route 202, displayed adjacent to the taxi route segment that crosses the corresponding runway. For example, taxiway N2 crosses both runway 04L-22R and 36-18 along the current taxi route 202.

Figure 3B:
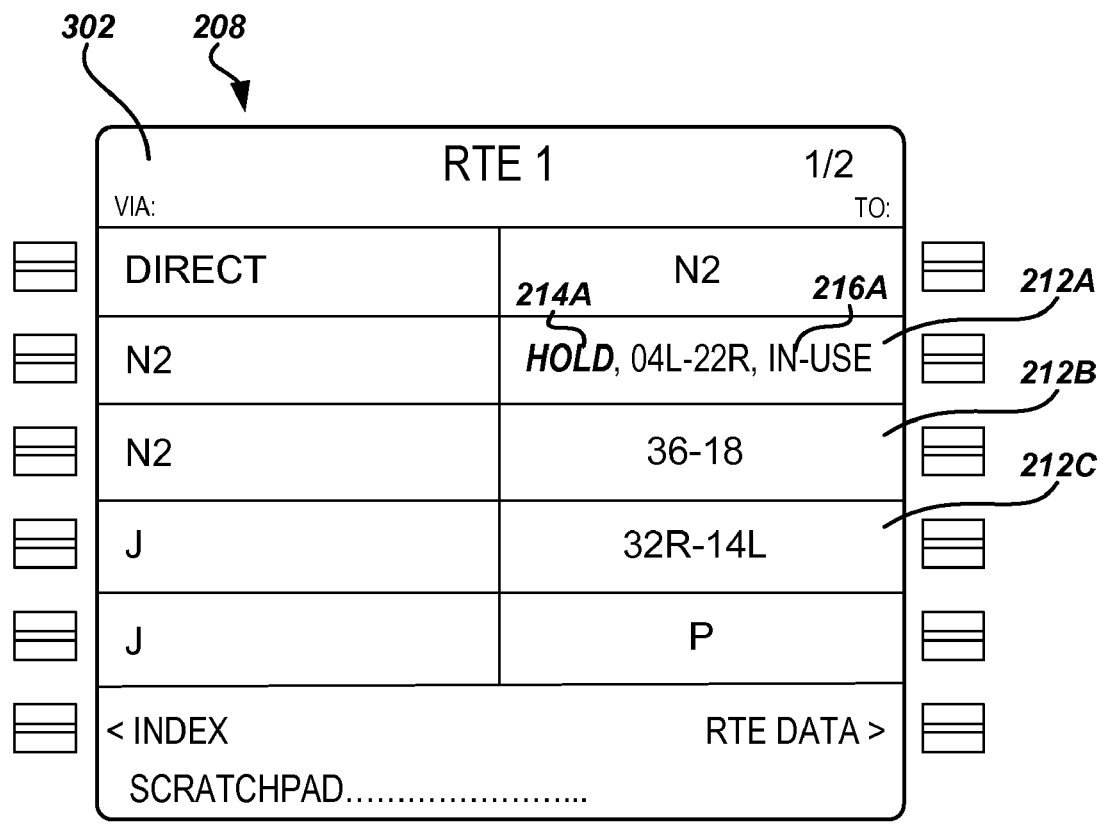

In another embodiment, the crossing runway information 212A-212C included in the alphanumeric taxi route display 208 on the CDU screen 302 also includes the ATC clearance information 214A and/or runway status information 216A for the corresponding runway, as shown in FIG. 3B. The ATC clearance information 214A or runway status information 216A may be included in the crossing runway information 212A-212C only for pending runway crossings, as shown in FIG. 3B, for all crossing runways, or a subset of crossing runways displayed in the alphanumeric taxi route display 208. It will be appreciated that the ATC clearance information 214A and runway status information 216A may be further coded by color, shape, attributes, or other visual indicator or aural tone or voice to indicate the pending or critical nature of the information, as discussed in detail above in regard to FIGS. 2A-2D.

Figure 4A:
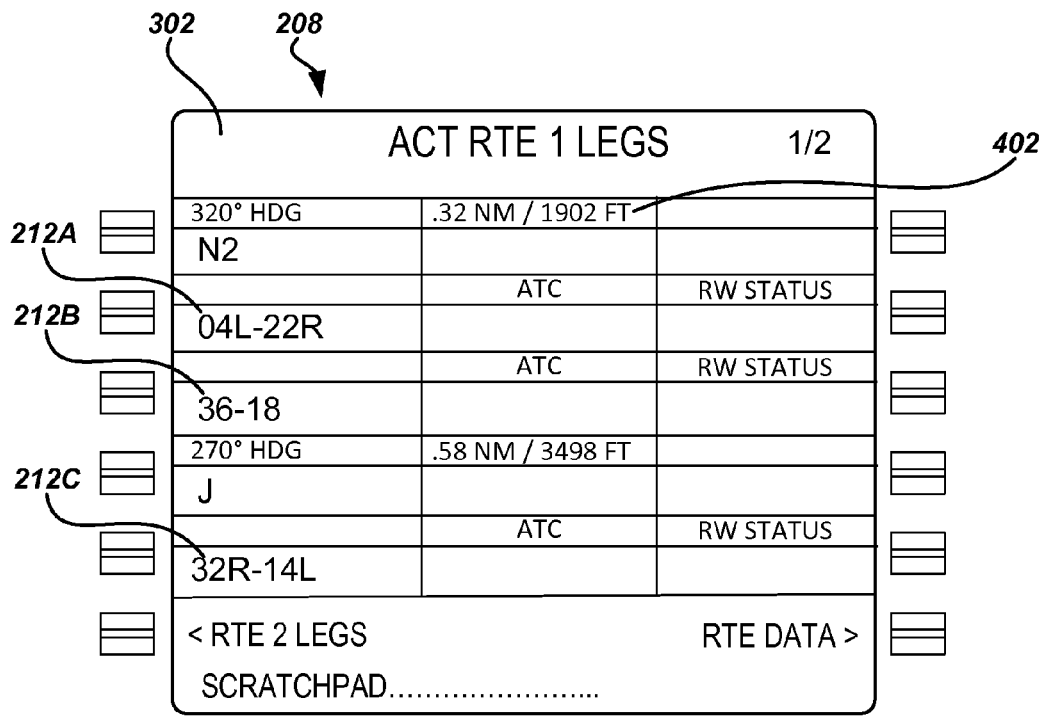
FIGS. 4A and 4B illustrate an alternative alphanumeric taxi route display including crossing runway information, according to a further embodiment presented herein.
Figure 4B:
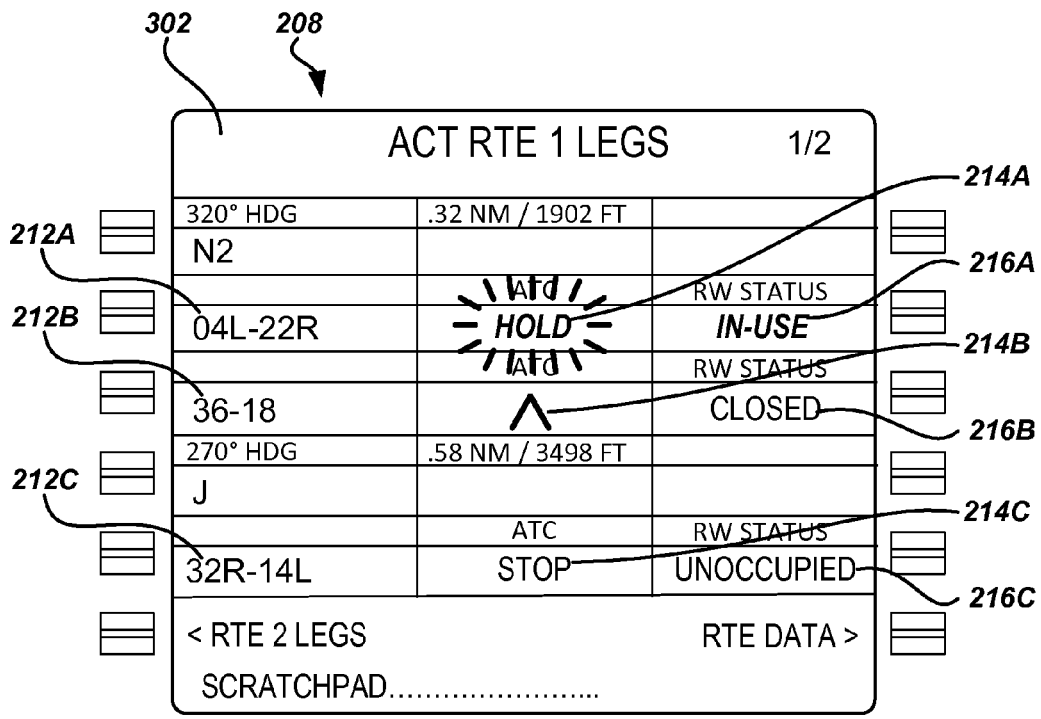

FIGS. 4A and 4B show a further embodiment of crossing runway information 212A-212C displayed in conjunction with an alphanumeric taxi route display 208 on the CDU screen 302. The CDU screen 302 shown in FIG. 4A displays a typical flight management function LEGS page incorporating crossing runway information 212A-212C into the alphanumeric taxi route display 208. The crossing runway information 212A-212C consists of the identifiers for the runways crossing the current taxi route 202, displayed in sequence with the segments or legs of the current route. For example, the aircraft proceeding along taxiway N2 will cross runway 04L-22R and then runway 36-18 along the current taxi route 202.

As further shown in FIG. 4A, the distance remaining 402 from the present position of the aircraft to the next segment within the taxi route may also be displayed. When displayed in conjunction with a crossing runway, the distance remaining may indicate the distance remaining from the present position of the aircraft to the runway crossing. The distance remaining 402 for the current leg and next crossing runway may be dynamically calculated and displayed as the aircraft proceeds along the taxi route. In one embodiment, the current leg of the taxi route is highlighted and is removed from the display when it is completed. In another embodiment, the next crossing runway along the current leg is highlighted as the aircraft approaches the runway along the taxi route and is further removed once the aircraft has crossed the runway.

In a further embodiment, the crossing runway information 212A-212C included in the alphanumeric taxi route display 208 on the CDU screen 302 also includes the ATC clearance information 214A-214C and/or runway status information 216A-216C for the corresponding runway, as shown in FIG. 4B. It will be appreciated that the ATC clearance information 214A-214C or runway status information 216A-216C may be further coded by color, shape, attributes, or other visual indicator or aural tone or voice to indicate the pending or critical nature of the information, as discussed in detail above in regard to FIGS. 2A-2D and further shown in FIG. 4B.

Figure 5:
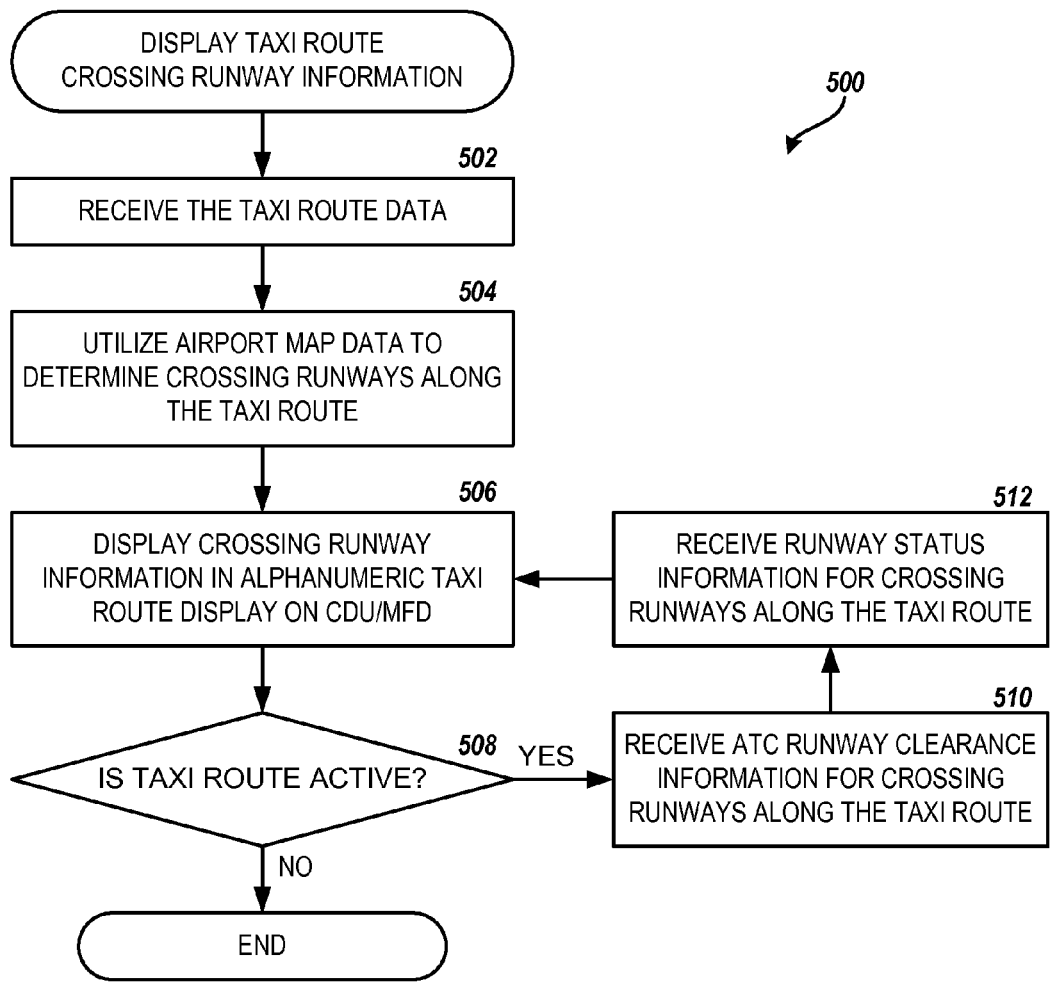
FIG. 5 is a flow diagram illustrating one method for displaying crossing runway information in conjunction with an alphanumeric taxi route display, as provided in the embodiments presented herein.

FIG. 5 shows one method 500 for displaying crossing runway information 212A-212C in conjunction with an alphanumeric taxi route display 208 on a display unit 106 of an aircraft. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

The method 500 begins at operation 502, where the crossing runway module 102 receives the taxi route data 104 related to the taxi route 202 for which to display the crossing runway information 212A-212C. As discussed above in regard to FIG. 1, the taxi route data 104 may be entered manually by the crew utilizing a CDU or other data entry terminal in the cockpit of the aircraft. Alternatively, the taxi route data 104 may be retrieved from previously stored taxi routes contained in an aircraft database, or it may be received over the ATC datalink 112 established between the aircraft and air traffic control.

From operation 502, the method 500 continues to operation 504, where the crossing runway module 102 utilizes the taxi route data 104 and airport map information 108 retrieved for the corresponding airport to determine the runways that cross the taxi route 202. As discussed above in regard to FIG. 1, the airport map information 108 may contain the taxiways and runways of the airport encoded in an electronic format, including all taxiway and runway junction points. The crossing runway module 102 may utilize a method to parse the taxi route data 104 and apply the junction point data from the airport map information 108 to determine the junction points 206A-206C between runways at the airport and the taxiways in the taxi route 202 represented in the taxi route data.

This operation may be performed independently by the crossing runway module 102 or may be performed by the FMS or some other aircraft host system as part of an overall taxi route parsing routine. The method utilized to parse the taxi route data 104 and apply the airport map information 108 may be similar to that described in co-pending U.S. patent application Ser. No. 12/133,114 entitled "System and Method for Taxi Route Entry Parsing," which is incorporated by reference herein in its entirety. It will be appreciated, however, that any number of methods or processes known in the art may be utilized by the crossing runway module 102 to determine the crossing runways from the taxi route data 104 and the airport map information 108.

Next, the method 500 proceeds from operation 504 to operation 506, where the crossing runway module 102 displays the crossing runway information 212A-212C in conjunction with the alphanumeric taxi route display 208 on the display unit 106, in accordance with the embodiments described above in regard to FIGS. 2A-4B. The crossing runway module 102 may display the crossing runway information 212A-212C on a CDU or on an MFD in the cockpit of the aircraft, as described above. The crossing runway module 102 may further display the crossing runway information 212A-212C on any display device inside or outside of the aircraft where the taxi route data 104 and airport map information 108 are available to generate the list of crossing runways.

From operation 506, the method 500 proceeds to operation 508, where the crossing runway module 102 determines if ATC clearance information 214A-214C and/or runway status information 216A-216C is to be displayed with the crossing runway information 212A-212C. The information to be displayed with the crossing runway information 212A-212C may depend on a number of factors, including, but not limited to, whether the taxi route 202 is currently active, the runway status, the ATC clearance, and whether the aircraft is approaching the junction point 206A-206C of one of the crossing runways as it progresses along the taxi route, as described above in regard to FIGS. 2A and 3B. The crossing runway module 102 may utilize the airplane systems, avionics, and ownship information 114 and the airport map information 108 to determine whether the aircraft is taxing and its position along the taxi route 202.

If the taxi route 202 is active, then the method 500 proceeds to operation 510, where the crossing runway module 102 receives the ATC clearance information 214A-214C for the crossing runways along the taxi route 202. The ATC clearance information 214A-214C may be manually entered by the crew on the CDU after receiving clearance from ATC via radio, for example, or the ATC clearance information may be received automatically via the ATC datalink 112 established between the aircraft and air traffic control.

In one embodiment, the ATC clearance information 214A-214C may be determined based on a predefined rule or rules. The predefined rules may be contained in the airport map information 108, received over the ATC datalink 112, entered manually by the crew, or obtained through some other data source. For example, an airport may have a rule that all aircraft approaching a runway crossing must hold until cleared to cross by the ATC. The rule may apply to all runways, selected runways, or only active runways. In this case, the ATC clearance runway information 214A-214C displayed for the crossing runways will be "HOLD" until contrary ATC clearance information for each crossing runway is received.

The method 500 then proceeds from operation 510 to operation 512, where the crossing runway module 102 receives the runway status information 216A-216C for the crossing runways along the taxi route 202. As is the case with the ATC clearance information, the runway status information 216A-216C may be manually entered by the crew on the CDU after monitoring radio communications or the ATIS broadcast for the airport, received automatically via the ATC datalink 112, or based upon a predefined rule or rules for the airport and/or crossing runway.

In an alternative embodiment, the crossing runway module 102 determines the status of crossing runways by utilizing aircraft and vehicle traffic information 116 received from other aircraft operating in the vicinity of the airport. The crossing runway module 102 may obtain the aircraft and vehicle traffic information 116 from the automatic dependent surveillance-broadcast ("ADS-B") system, which allows aircraft to periodically broadcast their position, speed, and direction along with other relevant information to other aircraft operating in the vicinity. Alternatively, the aircraft and vehicle traffic information 116 may be obtained from the ATC datalink 112, the traffic collision and avoidance system ("TCAS"), or some other on-board aircraft systems that provide traffic information.

The crossing runway module 102 may couple the position, speed, and direction information from the aircraft and vehicle traffic information 116 with the airport map information 108 to determine if any nearby aircraft are operating on the crossing runways along the taxi route 202, and resolve the status of the crossing runways based upon this determination. For example, the crossing runway module 102 may determine the status of a crossing runway to be "IN-USE" if an aircraft is operating on the crossing runway at a speed exceeding 50 knots, "OCCUPIED" if an aircraft is operating on the crossing runway at a speed of 50 knots or less, and "UNOCCUPIED" if no aircraft is operating on the crossing runway.

From operation 512, the method 500 returns to operation 506, where the crossing runway module 102 updates the crossing runway information 212A-212C displayed on the display unit 106. This may involve adding or removing ATC clearance information 214A-214C and/or runway status information 216A-216C, removing the crossing runway information 212A-212C once the corresponding runway has been crossed, or changing the color, shape, or other attributes of the displayed information to reflect the current status and ATC clearance of the corresponding crossing runways, as described in detail above in regard to FIGS. 2A-4B. The method 500 will continue to receive the latest ATC clearance information 214A-214C and/or runway status information 216A-216C and update the display of the crossing runway information 212A-212C as long as the taxi route 202 remains active. If, at operation 508, the taxi route is determined to no longer be active, the method 500 ends.

Figure 6:
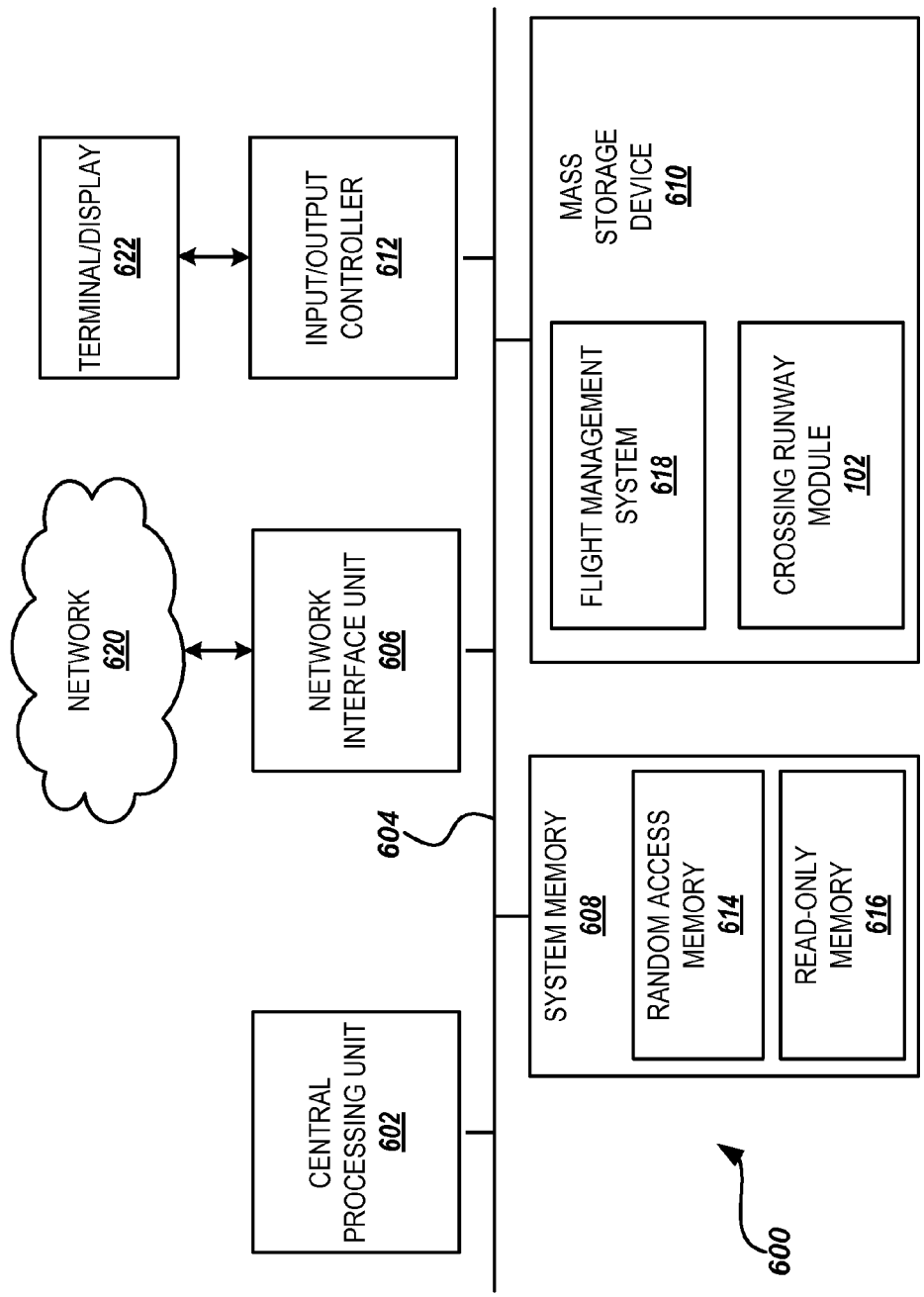
FIG. 6 is a block diagram showing an illustrative computer hardware and software architecture for a computing system capable of implementing aspects of the embodiments presented herein.

FIG. 6 shows an illustrative computer architecture for a computer 600 capable of executing the software components described herein for displaying taxi route control point information in the manner presented above. The computer architecture shown in FIG. 6 illustrates a conventional general-purpose computer system that may be utilized to execute aspects of the software components presented herein, such as a flight management computer found in a typical commercial aircraft.

The computer architecture shown in FIG. 6 includes a central processing unit 602 (CPU), a system memory 608, including a random access memory 614 (RAM) and a read-only memory 616 (ROM), and a system bus 604 that couples the memory to the CPU 602. The computer 600 also includes a mass storage device 610 for storing an operating or control system, such as the FMS 618, specific application modules, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to other aircraft systems and remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, electronic stylus, or touchscreen, such as may be present on a connected CDU 300 or other terminal device in the aircraft. Similarly, an input/output controller 612 may provide output to a display unit 106, a printer, or other type of output device.

As mentioned briefly above, a number of program modules and data files may be stored in the mass storage device 610 and RAM 614 of the computer 600, including a flight management system 618 suitable for controlling the operation of a flight management computer. The mass storage device 610 and RAM 614 may also store one or more program modules. In particular, the mass storage device 610 and the RAM 614 may store the crossing runway module 102, which was described in detail above in regard to FIG. 1. The mass storage device 610 and the RAM 614 may also store other types of program modules or data.

Based on the foregoing, it should be appreciated that technologies for displaying crossing runway and other taxi route control point information in conjunction with an alphanumeric taxi route display in an aircraft are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for displaying taxi route control point information on a display unit of a vehicle, comprising:
   receiving taxi route data;
   upon receiving the taxi route data, utilizing airport map information to determine a taxi route control point along a taxi route described by the taxi route data;
   collecting one or more of current clearance and status information associated with the taxi route control point; and
   embedding an identifier of the taxi route control point and the one or more of current clearance and status information associated with the taxi route control point in an alphanumeric taxi route display on the display unit at a position within a sequence of the alphanumeric taxi route display corresponding to a location of the taxi route control point along the taxi route.

2. The method of claim 1, wherein the one or more of current clearance and status information associated with the taxi route control point is received from air traffic control ("ATC").

3. The method of claim 1, wherein collecting the one or more of current clearance and status information associated with the taxi route control point comprises receiving one or more of runway status information and taxiway status information associated with the taxi route control point.

4. The method of claim 1, further comprising periodically updating the display of the one or more of current clearance and status information associated with the taxi route control point as the vehicle progresses along the taxi route.

5. The method of claim 1, wherein the one or more of current clearance and status information associated with the taxi route control point are embedded in the alphanumeric taxi route display upon determining that the vehicle is approaching the taxi route control point while progressing along the taxi route.

6. The method of claim 1, wherein receiving the taxi route data comprises receiving the taxi route data from at least one of previously stored taxi routes, ATC datalink, and manual pilot input.

7. The method of claim 1, wherein the one or more of current clearance and status information associated with the taxi route control point is received from at least one of a predefined rule, ATC datalink, and manual pilot input.

8. The method of claim 3, wherein receiving one or more of the runway status information and the taxiway status information comprises receiving the runway status information and the taxiway status information from at least one of a predefined rule, ATC datalink, and manual pilot input.

9. The method of claim 3, wherein receiving one or more of the runway status information and the taxiway status information comprises:
   receiving aircraft traffic information regarding aircraft operating in proximity to the vehicle;
   upon receiving the aircraft traffic information, utilizing the airport map information to determine a position, a heading, and a speed of the aircraft in relation to a runway or a taxiway associated with the taxi route control point based on the aircraft traffic information; and
   determining the runway status information or the taxiway status information based upon the position, the heading, and the speed of the aircraft in relation to the runway or the taxiway associated with the taxi route control point.

10. The method of claim 1, wherein the one or more of current clearance and status information associated with the taxi route control point is displayed in conjunction with a graphical map display of the taxi route.

11. The method of claim 1, wherein the display unit comprises at least one of a multi-functional display unit, a control display unit, a dedicated display unit, a handheld display unit, an electronic flight bag, and a printer in a cockpit of an aircraft.

12. A system for displaying taxi route control point information for a vehicle operating at an airport, comprising:
   a memory for storing a program containing computer-executable instructions for displaying taxi route control point information; and
   a processing unit functionally coupled to the memory, the processing unit being responsive to the computer-executable instructions and operative to:
   receive taxi route data,
   upon receiving the taxi route data, utilize airport map information to determine a taxi route control point along the taxi route described by the taxi route data, wherein the taxi route control point comprises a crossing runway,
   collect current clearance and status information associated with the taxi route control point, and
   embed the current clearance and status information associated with the taxi route control point in an alphanumeric taxi route display on a display unit in the vehicle, wherein the current clearance and status information associated with the taxi route control point is embedded at a position within a sequence of the alphanumeric taxi route display corresponding to a location of the taxi route control point along the taxi route.

13. The system of claim 12, wherein the current clearance and status information associated with the taxi route control point is received from air traffic control ("ATC").

14. The system of claim 12, wherein collecting the current clearance and status information associated with the taxi route control point comprises receiving runway status information associated with the taxi route control point.

15. The system of claim 12, wherein the processing unit is further operative to:
periodically determine a progress of the vehicle along the taxi route; and
update the display of the information associated with the taxi route control point based on the progress of the vehicle along the taxi route.

16. The system of claim 12, wherein the processing unit is further operative:
receive traffic information associated with aircraft operating in proximity to the vehicle;
upon receiving the traffic information, utilize the airport map information to determine a position, a heading, and a speed of the aircraft in relation to a runway or a taxiway associated with the taxi route control point based on the traffic information;
determine runway status information or taxiway status information associated with the taxi route control point based upon the position, the heading, and the speed of the aircraft in relation to the runway or the taxiway; and
display the runway status information or the taxiway status information with the information associated with the taxi route control point in the alphanumeric taxi route display.

17. A computer-readable medium containing computer-executable instructions that, when executed by a flight management computer of an aircraft, cause the flight management computer to:
receive taxi route data;
utilize airport map information describing an airport at which the aircraft is operating to determine a taxi route control point along a taxi route described by the taxi route data;
determine identifying information associated with the taxi route control point from the map information;
receive current air traffic control ("ATC") clearance information for the taxi route control point; and
embed the identifying information and the current ATC clearance information for the taxi route control point in an alphanumeric taxi route display on a display unit of the aircraft, wherein the identifying information and the current ATC clearance information are embedded at a position within a sequence of the alphanumeric taxi route display corresponding to a location of the taxi route control point along the taxi route.

18. The computer-readable medium of claim 17, containing further computer-executable instructions that cause the flight management computer to:
receive one or more of current runway status information and taxiway status information associated with the taxi route control point; and
display the current runway status information and taxiway status information with the identifying information and the current ATC clearance information associated with the taxi route control point in the alphanumeric taxi route display.

19. The computer-readable medium of claim 17, wherein the display unit comprises at least one of a multi-functional display unit, a control display unit, a dedicated display unit, a handheld display unit, an electronic flight bag, and a printer in a cockpit of the aircraft.

20. The computer-readable medium of claim 17, wherein receiving the current ATC clearance information comprises receiving the ATC clearance information from at least one of a predefined rule, ATC datalink, and manual pilot input.

\* \* \* \* \*